United States Patent [19]

Taniguchi

[11] 3,972,663

[45] Aug. 3, 1976

[54] METHOD AND APPARATUS FOR PACKAGING ELECTRONIC COMPONENTS WITH THERMOSETTING MATERIAL

[75] Inventor: Kanazu Taniguchi, Tokyo, Japan

[73] Assignee: Toko Incorporated, Tokyo, Japan

[22] Filed: Mar. 13, 1974

[21] Appl. No.: 450,884

Related U.S. Application Data

[62] Division of Ser. No. 325,833, Jan. 22, 1973.

[52] U.S. Cl. .................................. 425/125; 29/588; 425/129 R; 425/250

[51] Int. Cl.[2] .......................................... B29F 1/10

[58] Field of Search ...... 425/125, 117, 129, DIG. 5, 425/250; 29/588; 264/272; 174/52 DE; 336/96

[56] References Cited

UNITED STATES PATENTS

| | | | |
|---|---|---|---|
| 29 | | | |
| 2,465,799 | 3/1949 | Gravesen | 264/272 X |
| 3,091,809 | 6/1963 | Trueblood | 425/246 X |
| 3,315,309 | 4/1967 | Braun | 425/123 |
| 3,357,058 | 12/1967 | Kutik | 425/250 |
| 3,449,641 | 6/1969 | Lee | 264/272 |
| 3,493,908 | 2/1970 | Byers et al. | 174/52 PE |
| 3,568,247 | 3/1971 | Lunn | 425/243 X |
| 3,712,575 | 1/1973 | Bement et al. | 264/272 X |

*Primary Examiner*—Francis S. Husar
*Assistant Examiner*—Carl Rowold
*Attorney, Agent, or Firm*—Cushman, Darby & Cushman

[57] ABSTRACT

A method and apparatus for packaging electronic components such as for example pulse transformers or the like with a thermosetting material such as for example a phenolic or epoxy resin. A pulse transformer element comprising a toroidal ferrite core having coils wound thereon embedded in a thermosetting base member provided with an intermediate flange-like portion, and terminal pins, is inserted in a lower mold cavity formed in a mold magazine, with the terminal pins inserted in elongated slots formed in the bottom surface of the lower mold cavity which is isolated by the pulse transformer element per se from the upper mold cavity into which the thermosetting material is injected. The aforementioned flange-like portion of the pulse transformer element has its top surface raised slightly above that of the lower mold and its periphery engaged with the upper mold, and it is softened by the heat of the molds, thus producing a sealing effect between the upper and lower mold cavities, whereby flash is caused to occur neither between the molds nor at the terminal pins of the packaged product.

2 Claims, 12 Drawing Figures

7
7a
3
2
6
4a
4b
6f
6f
5
5
6g
4c
6g
6h

OPENING AND CLOSING MEANS
9
7
7b
HEATER
10
7a
7d
7c
6b
g
6f
6a
6e
6g
8c
8
8d
8b
8a

INJECTOR
OPENING AND CLOSING MEANS
9
7
7b
8
HEATER
10
7a
7d
7c
6f
6e
8d
6g
8b
8c
6b
6a
6

METHOD AND APPARATUS FOR PACKAGING ELECTRONIC COMPONENTS WITH THERMOSETTING MATERIAL

This is a division of application Ser. No. 325,833, filed Jan. 22, 1973.

BACKGROUND OF THE INVENTION

1. Field of the Invention

This invention relates generally to environmental protection for electronic components, and more particularly it pertains to a method and apparatus for packaging electronic components such as for example pulse transformers or the like with a thermosetting material.

2. Description of the Prior Art

Pulse transformers, which find extensive use in the fields of electronic computers, communications equipment and so forth, are required to have a high reliability permanently. In order to meet such a requirement, various methods have already been proposed, among which is a method of encapsulating pulse transformer elements with a thermosetting material such as a phenolic or epoxy resin. Such pulse transformer elements comprise a toroidal core having coils wound thereon and embedded in a plate-like base member of an insulating material which is provided at opposite sides thereof with a plurality of terminal pins extending vertically therethrough, with the upper ends of which are connected the ends of the aforementioned coils.

In the conventional method, use is made of a molding cavity defined by upper and lower molds having discrete holes about 0.5 to 1.2 mm in diameter formed in the bottom surface thereof, and the terminal pins of the pulse transformer elements are inserted into the holes of the molding cavity prior to molding operation. Obviously, this prior art technique has disadvantages. It is very tedious and inefficient to insert the terminal pins into the cavity holes individually. In addition, it is inevitable that a thermosetting material injected into the molding cavity is caused to enter the holes mentioned above and adhere to the terminal pins so that flashes are caused to occur not only between the upper and lower molds but also at the terminal pins of the encapsulated pulse transformer elements. After the molding operation is completed, such flashes must be removed from the finished products. Apparently, this not only lowers the efficiency of operation but also leads to a poor yield since it is very likely that during the removal of the flashes, the finished products are damaged so that their appearance is deteriorated or in the worst case they become unmarketable. Furthermore, forming the discrete holes, which are required to have a precise dimension, in the cavity surface, makes the molds per se expensive.

SUMMARY OF THE INVENTION

The primary object of this invention is to provide a simplified, inexpensive method and apparatus for producing an improved environmental protection for electronic components such as for example pulse transformers or the like.

Another object of this invention is to provide an improved method and apparatus for packaging pulse transformer elements, wherein flash is caused to occur neither between the upper and lower molds nor at the terminal pins of the pulse transformer elements.

Other objects and advantages of this invention will be apparent to those skilled in the art from the following description, drawings and appended claims.

According to this invention, a novel method and apparatus for packaging electronic components such as for example pulse transformers or the like with a thermosetting material such as a phenolic or epoxy resin are provided, wherein a pulse transformer element comprising a toroidal ferrite core having coils wound thereon embedded in a base member provided with an intermediate flange-like portion, and terminal pins, is inserted in a lower mold cavity formed in a mold magazine, with the terminal pins inserted in elongated slots formed in the lower mold cavity at opposite sides thereof which is isolated from the upper mold cavity into which the thermosetting material is injected, and wherein when the upper and lower molds are clamped, the aforementioned flange-like portion has its top surface raised slightly above that of the lower mold and its periphery engaged with the upper mold so that a sealing effect is produced between the upper and lower mold cavities when the flange-like portion is softened by the heat of the molds, whereby flash is caused to occur neither between the molds nor at the terminal pins of the packaged product.

DESCRIPTION OF THE PREFERRED EMBODIMENT

Figure 1A:
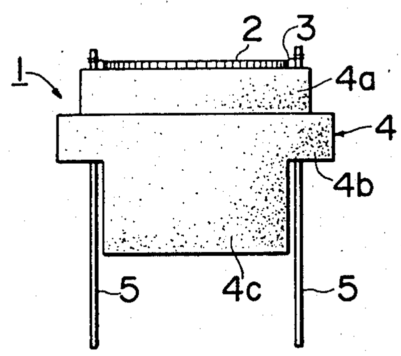
FIG. 1A and 1B are an elevational side view and top plan view of an example of pulse transfer element to which this invention is applicable, respectively.
Figure 1B:
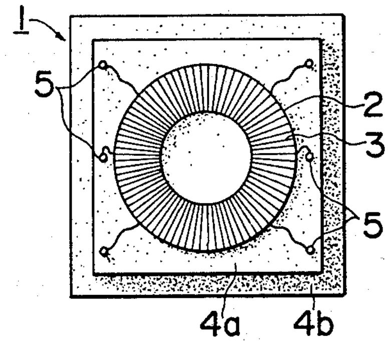

Referring first to FIGS. 1A and 1B of the drawings, a pulse transformer element to be packaged with a thermosetting material in accordance with this invention is shown generally at 1, which comprises a toroidal ferrite core 2 having coils 3 wound thereon and embedded in a base member 4 formed of a thermosetting material such as for example a phenolic or epoxy resin. The base member 4 comprises a top portion 4*a*, intermediate flange-like portion 4*b* and bottom portion 4*c*. Reference numeral 5 indicates terminal pins extending vertically through the top and intermediate portions 4a and 4b in spaced relationship with the side surfaces of the bottom portion 4c. The ends of the coils 3 are connected with the upper ends of the terminal pins 5. Though six such terminal pins are shown in the drawings, it is possible that any desired number of such pins may be provided.

Figure 2A:
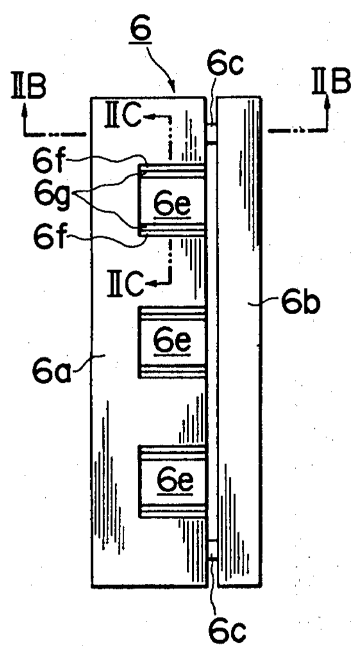
FIG. 2A is a top plan view showing an example of the mold magazine according to this invention which comprises a cavity body and a side plate secured thereto.
Figure 2B:
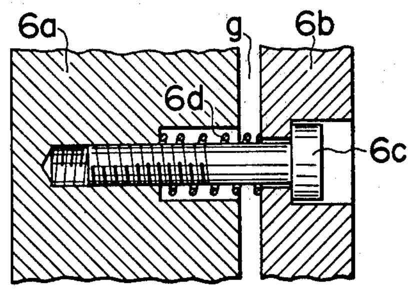
FIG. 2B is a sectional view taken along the line IIB—IIB of FIG. 2A, showing the manner in which the side plate of the magazine is secured to the cavity body.
Figure 2C:
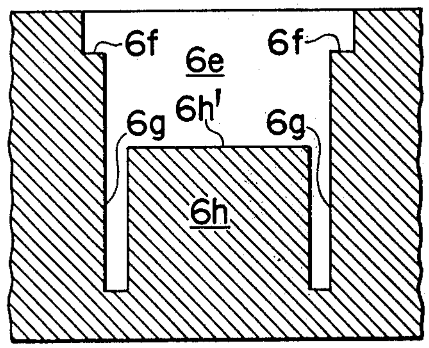
FIG. 2C is a fragmentary enlarged sectional view taken along the line IIC—IIC of FIG. 2A, showing one of the cavities formed in the magazine.

Turning now to FIG. 2A, there is shown a mold magazine 6 embodying this invention which comprises a main body 6a and a side plate 6b. The side plate 6b is secured to the main body 6a by means of screw pins 6c which are adjustably threaded into the main body through formed in the side plate, and it is outwardly biased by means of springs 6d interposed between the main body and the side plate, as shown in FIG. 2B, so that the side plate is laterally spaced apart from the main body 6a as indicated at g. The main body 6a is formed with cavity portions 6e each of which comprises stepped portions 6f provided on opposite sides, elongated slots 6g extending in adjacent parallel relationship with the stepped portions, and a pedestal portion 6h provided between the elongated slots 6g. The pedestal portion 6h has a substantially flat top surface 6h' on which the bottom portion of the pulse transformer element 1 described above in connection with FIGS. 1A and 1B is to rest, and the stepped portions 6f are designed so that the flange-like portion 4b of the pulse transformer element is snugly engaged therewith. It is to be noted particularly that the depth of the stepped portions 6f is established to be smaller than the thickness of the flange-like portion 4b of the pulse transformer element 1 slightly, say about 0.2 to 0.6 mm, as will be described in detail with reference to FIG. 6. The difference between the depth of the stepped portions 6f and the thickness of the flange-like portion 4b is not restricted to the aforementioned range, but it can be selectively established depending upon the size of the component to be packaged, clamping pressure of the molds, type of the thermosetting material in use and so forth.

Figure 3:
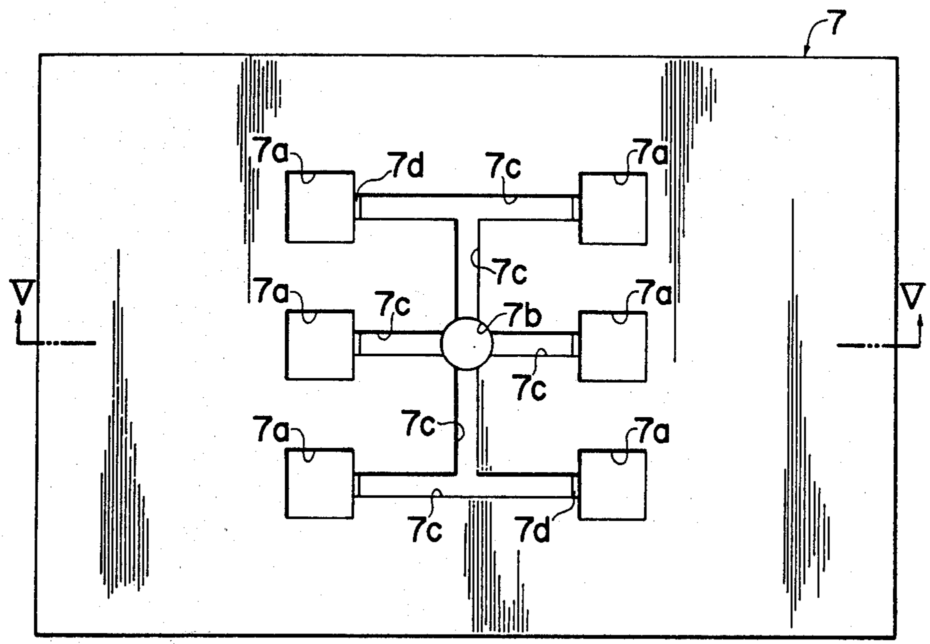
FIG. 3 is a bottom plan view showing an example of the upper mold according to this invention.

Referring to FIG. 3, the upper mold according to the present invention is shown generally at 7, which is provided with six cavity portions 7a, for example, which are in communication with an inlet port 7b for a tablet of a thermosetting material such as a phenolic or epoxy resin through grooves or runners 7c.

Figure 4:
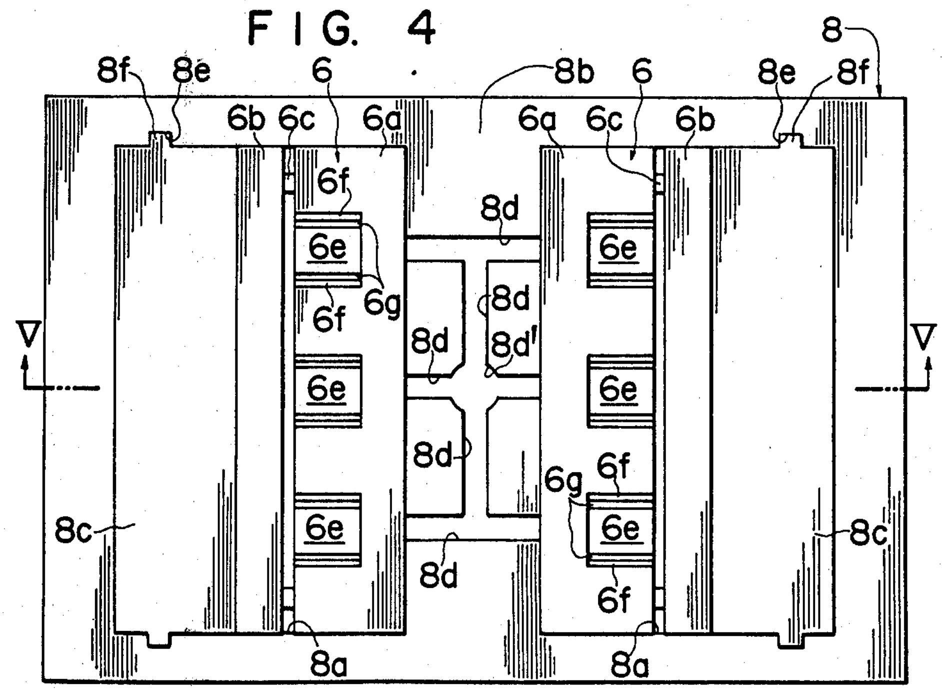
FIG. 4 is a top plan view showing an example of the lower mold according to this invention, together with the magazines mounted thereon.

FIG. 4 shows the lower mold according to the present invention generally at 8, which is provided with a pair of recesses 8a, in which the magazines 6 are inserted, a central bank portion 8b by which the recesses 8a are separated from each other, and a pair of movable push members 8c with which the side plates 6b of the magazines 6 are engaged when the latter are inserted in the recesses. The central bank portion 8b is formed in the upper surface thereof with a circular recess 8d' and grooves or runners 8d extending therefrom in correspondence to the inlet port 7b and runners 7c of the upper mold 7.

Figure 5A:
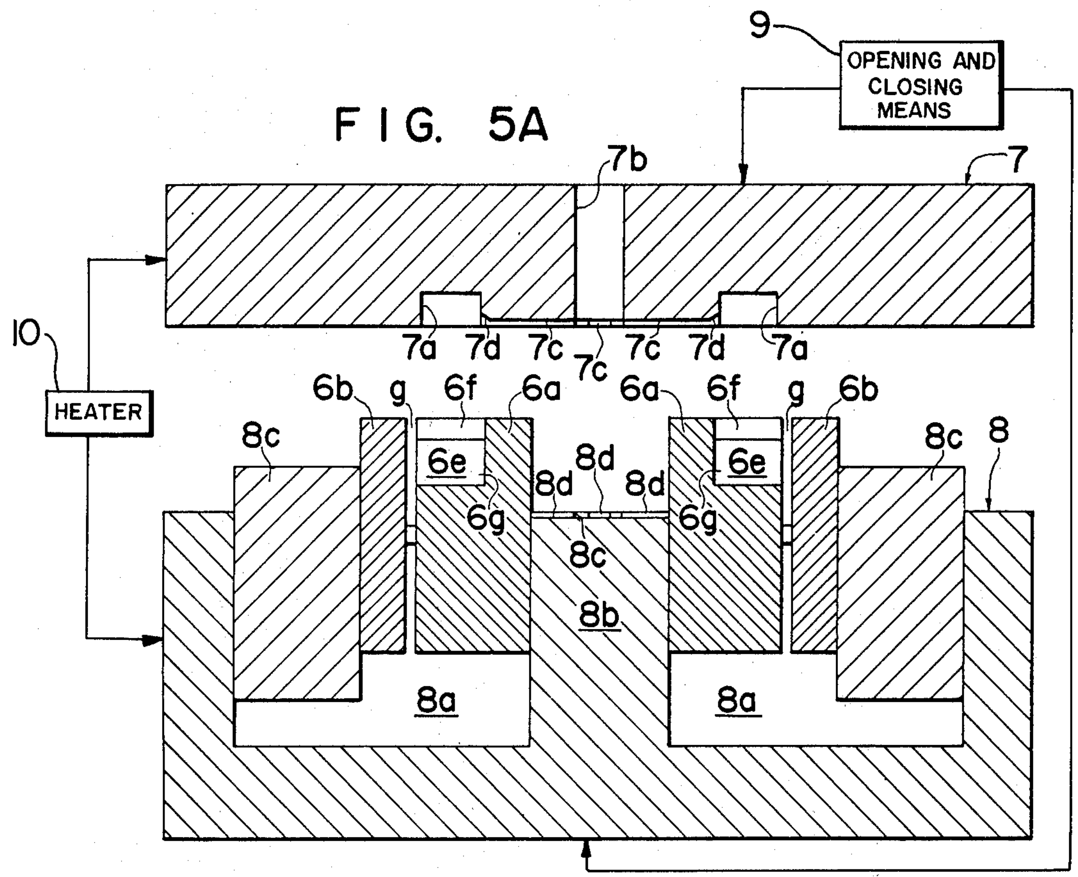
FIG. 5A and 5B are sectional views taken along the lines V—V of FIGS. 3 and 4, showing the upper and lower molds as separated and engaged, respectively.

When inserted in the recesses 8a of the lower mold 8, the magazines 6 are initially held above the bottoms of the recesses 8a by suitable means such as for example knock-out pins (not shown) extending upwardly from the recess bottoms, with the side plates 6b disposed in engagement with the push members 8c which are also held above the bottoms of the recesses 8a, for example, by means of springs (not shown) as shown in FIG. 5A wherein the upper and lower molds 7 and 8 are shown as separated from each other.

Figure 5B:
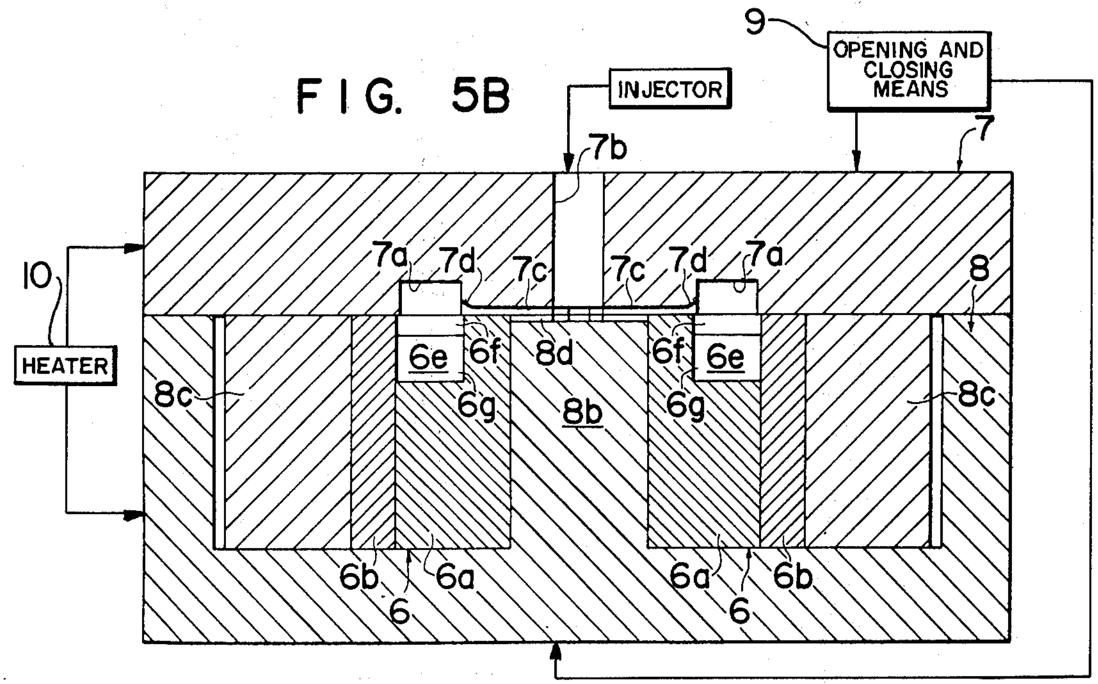

FIG. 5B shows the upper and lower molds 7 and 8 as closed, from which it will be seen that as the two molds are relatively moved toward each other by any suitable means 9 known in the art, the magazines 6 and push members 8c are engaged and pushed down by the upper mold 7 so as to be brought into contact with the recess bottoms. When pushed down as mentioned above, the push members 8c are slidden obliquely while being guided by guide grooves 8e (FIG. 4) formed in the surfaces of the recesses 8a, with obliquely extending projections 8f (FIG. 4) provided on the corresponding side surfaces of the push members 8c being disposed in engagement with the oblique guide grooves 8e of the recesses 8a as shown in FIG. 4. The inclination of the oblique grooves 8e and projections 8f is so established that as a result of the downward movement mentioned above, the push members 8c are laterally displaced toward the side plates 6b of the magazines 6 a distance corresponding to the gap g between the side plates 6b and the main bodies 6a of the magazines 6. Thus, when the two molds 7 and 8 are closed, the side plates 6b are brought into tight contact with the main bodies 6a of the magazines by means of the push members 8c, as shown in FIG. 5B. In this FIG., numeral 7d indicates gates through which the runners 7c are in communication with the cavity portions 7a of the upper mold 7 respectively. It is to be noted particularly that the cavity portions 7a of the upper mold 7 are so designed that the spacing between opposing side surfaces thereof is smaller than that of each cavity portion 6e of the magazines 6 slightly, say about 0.2 to 0.5 mm, as will be seen from FIGS. 5B and 6B. The difference in dimension between the upper and lower mold cavities is not restricted to the range mentioned above, but it can be selectively established depending upon the size and appearance of the components to be packaged, type of the thermosetting material in use and so forth.

Description will now be made of the present method with reference to FIGS. 6A and 6B.

Figure 6A:
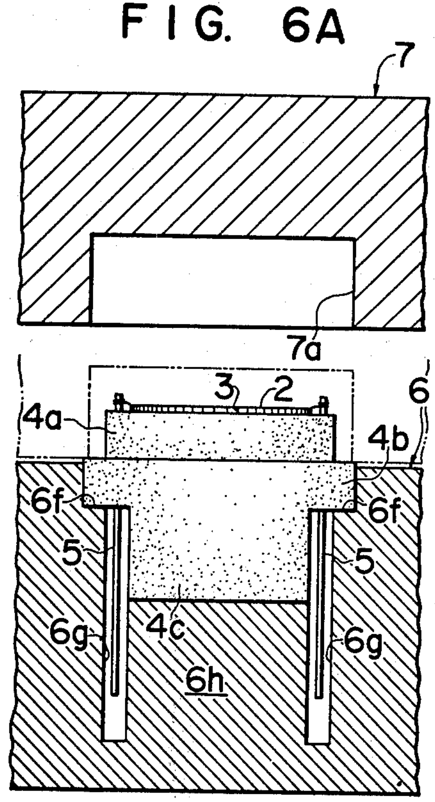
FIGS. 6A and 6B are fragmentary enlarged sectional views of the upper and lower mold cavity portions with a pulse transformer element inserted in the lower mold cavity portion, which illustrate how packaging of the pulse transformer element is achieved according to this invention.
Figure 6B:
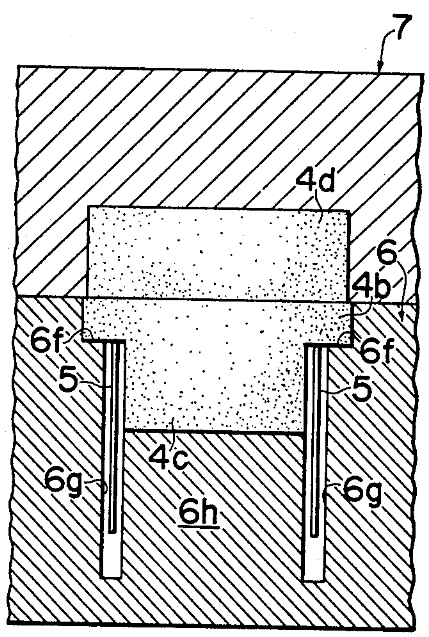

First of all, the pulse transformer element 1 described above in connection with FIGS. 1A and 1B is inserted into each of the cavity portions 6e of the magazines 6, as shown in FIG. 6A. The terminal pins 5 are inserted into the elongated slots 6g, and the flange-like portion 46 is placed in snug engagement with the stepped portions 6f so that the cavity portion 6e is completely covered with the flange-like portion 4b. In this case, since the depth of the stepped portions 6f is established to be slightly smaller than the thickness of the flange-like portion 4b as already mentioned above, the upper surface of the flange-like portion 4b, when the latter is disposed in engagement with the stepped portions 6f, is higher than that of the magazine 6, as best shown in FIG. 6A.

when moved down to a position as indicated by broken lines, the upper mold 7 contacts the upper surface of the flange-like portion 4b. As the upper mold 7 is further moved toward the lower mold, the flange-like portion 4b engaged thereby is softened by the heat of the molds which are heated up to about 120° to 180°C by a heater 10 of conventional design shown schematically in FIGS. 5A and 5B, and then the two molds are completely closed as shown in FIG. 6B. It should be noted particularly that a perfect sealing effect results from the fact that the flange-like portion 4b is softened as mentioned just above and the periphery thereof is engaged with the upper mold 7 as shown in FIG. 6B. Subsequently, with the two molds 7 and 8 closed as shown in FIG. 6B, a tablet of a thermosetting material such as a phenolic or epoxy resin is thrown into the inlet port *7b* of the upper mold 7. Preferably, such a tablet is preheated by means of a high frequency as high as about 60 MHz for about 1 to 1.5 minutes. The tablet inserted in the inlet port *7b* is then compressed against the circular recess *8d'* (FIG. 4) by means of a plunger shown schematically in FIG. 5B and melted so as to be injected or transferred into each of the cavity portions *7a* formed in the upper mold 7 through the runners *7c*, *8d* and gates *7d*. The injection is effected under a pressure of about 400 to 500 psi gauge. After the injection is completed, the two molds are maintained under the closed condition for about 3 to 5 minutes. In this way, the pulse transformer element has its top portion *4a* packaged with the thermosetting material as indicated at *4d* in FIG. 6B.

Thereafter, the two molds are separated as shown in FIG. 5B, and then the magazines 7 are taken out of the lower mold. At this point, the side plate *6b* of each magazine is automatically spaced apart from the main body *6a*, so that subsequent removal of each packaged pulse transformer from the magazines is greatly facilitated.

Figure 7:
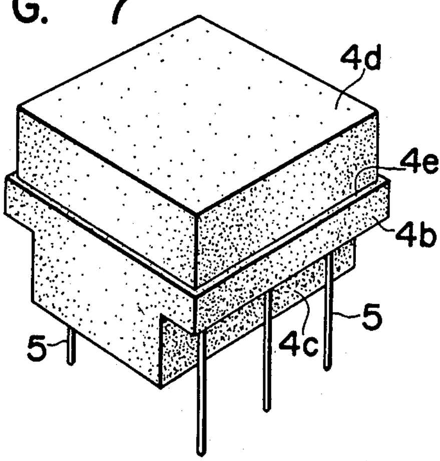
FIG. 7 is a perspective view showing a pulse transformer encapsulated with a thermosetting material in accordance with this invention.

FIG. 7 shows the pulse transformer packaged in accordance with the present invention, which is provided with a stepped portion *4e* which serves to prevent the appearance of the finished product from being adversely affected by any possible mismatch between the two molds.

As will be readily appreciated from what has been described above, in accordance with the present invention, the efficiency of operation can be greatly enhanced because terminal pins are inserted into the elongated slots rather than into discrete holes individually. In addition, any possibility that the thermosetting material tends to adhere to the terminal pins so as to constitute flash can be completely eliminated by the fact that the aforementioned slots are isolated from the cavity into which the thermosetting material is injected, so that an excellent yield and good appearance of the products as well as a further improved efficiency of operation can be achieved because no additional operation for flash removal or deflash is required during which damages to the package of each product are very liable to occur. Furthermore, the cost of the molds per se can be reduced because the elongated slots are not required to have a precise dimension unlike discrete holes utilized in the prior art.

While a preferred embodiment of this inventon has been described in detail, it will be obvious to those skilled in the art that the invention may be embodied otherwise without departing from its spirit and scope.

What is claimed is:

1. An apparatus for packaging electronic components with a thermosetting material, said electronic components each comprising a premolded base member of a thermosetting material, said base memember being provided with a top portion, an intermediate flange-like portion and a bottom portion and having an electronic element embedded therein with terminal pins extending vertically through said intermediate flange-like portion and said top portion in spaced relationship with the side surfaces of said bottom portion and connected at the top portion thereof to said electronic element, said apparatus comprising upper mold means provided with at least one mold cavity portion and an inlet port communicating therewith, lower mold means below said upper mold means are provided with at least one mold cavity portion into which the electronic component is to be inserted, heater means operatively connected with said upper and lower mold means for heating said upper and lower mold means up to the softening temperatures of said thermosetting material which comprises said base member, means operatively connected to said upper and lower mold means for causing said upper and lower mold means to be moved into engagement with each other so that at least one mold cavity is defined by said at least one lower mold cavity portion and said at least one upper mold cavity portion, and injector means adjacent said upper mold means and connectible to said inlet port for injecting a molten thermosetting material into said mold cavity, said lower mold cavity portion comprising a central pedestal portion with elongated slots provided at the sides of said central pedestal portion and each capable of receiving plural terminal pins simultaneously and with stepped side portions being provided at the tops of the side walls of the elongated slots opposing the side surfaces of said central pedestal portion, the depth of said stepped side portions being slightly smaller than the thickness of said intermediate flange-like portion of said electronic component, the opening area of said upper mold cavity portion being slightly smaller than that of said lower mold cavity portion, said electronic component to be packaged being insertable into said lower mold cavity portion, said bottom portion of said base member thereof being positionable on said central pedestal portion, said terminal pins thereof being insertable in said elongated slots, and said intermediate flange-like portion thereof being engageable with said stepped portions of said lower mold so that said elongated slots each accommodate a plurality of said terminal pins therein, said pins being fluid-tightly enclosed by the engagement of said intermediate flange-like portion of said component with said stepped side portions as said intermediate flange-like portion is softened by the heat of said heater means, wherein after the electronic component has been inserted in said lower mold cavity portion, said upper and lower mold means being movable into engagement with each other so that said upper mold cavity portion is fluid-tightly isolated from said lower mold cavity portion, and said injector means injecting the molten thermosetting material into the upper mold cavity portion, whereby said electronic component is molded with said thermosetting material without having said thermosetting material adhere to the terminal pins thereof to thereby cause flashing to occur between the upper and lower mold means.

2. An apparatus according to claim 1, wherein said lower mold cavity portions are formed in a mold magazine which is adapted to be detachably mounted on said lower mold means, said mold magazine comprising a main body having said lower mold cavity portions formed therein and a side plate secured to said main body, said side plate being resiliently biased so as to be spaced apart from said main body and adapted to be brought into contact therewith so as to define said lower mold cavity portions when said mold magazine is mounted onto said lower mold means.

* * * * *